Dec. 26, 1950     C. A. HEILAND     2,535,065
GALVANOMETER

Filed Aug. 11, 1944     5 Sheets-Sheet 1

Inventor
Carl A. Heiland
BY
Davis, Lindsey, Smith & Shonts,
Attorneys.

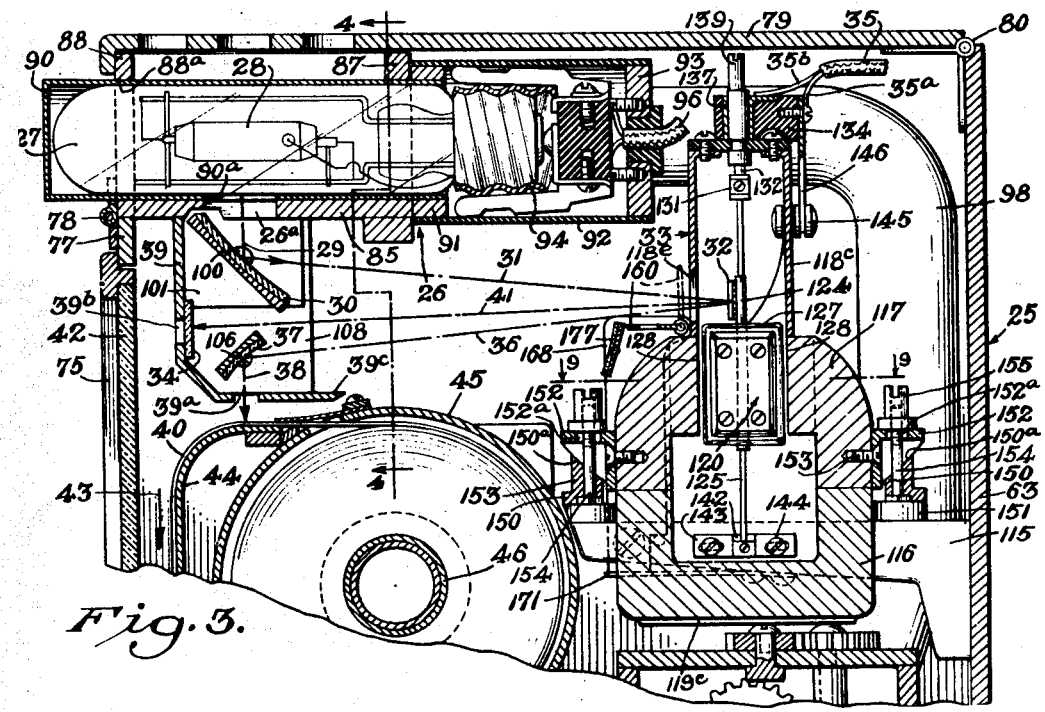

Dec. 26, 1950 C. A. HEILAND 2,535,065
GALVANOMETER
Filed Aug. 11, 1944 5 Sheets-Sheet 3

Inventor
Carl A. Heiland
BY
Davis, Lindsey, Smith & Shonts,
Attorneys.

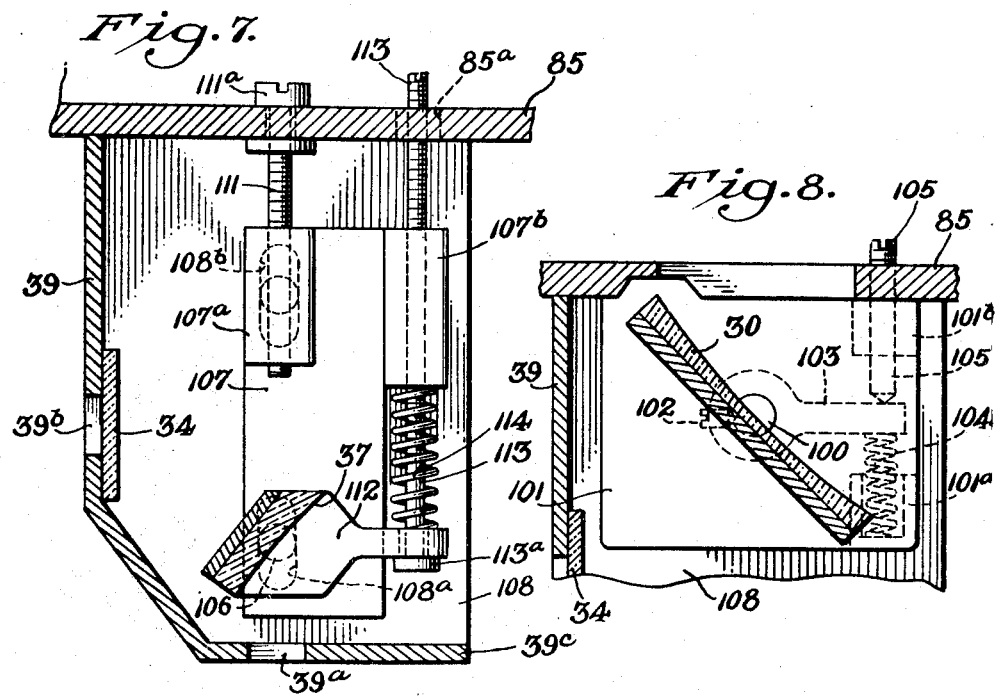
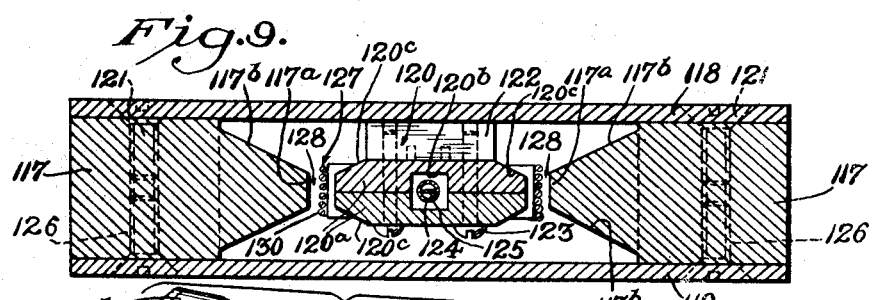
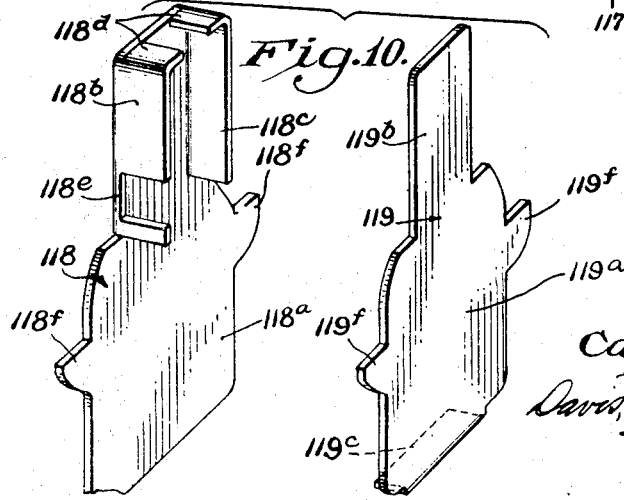

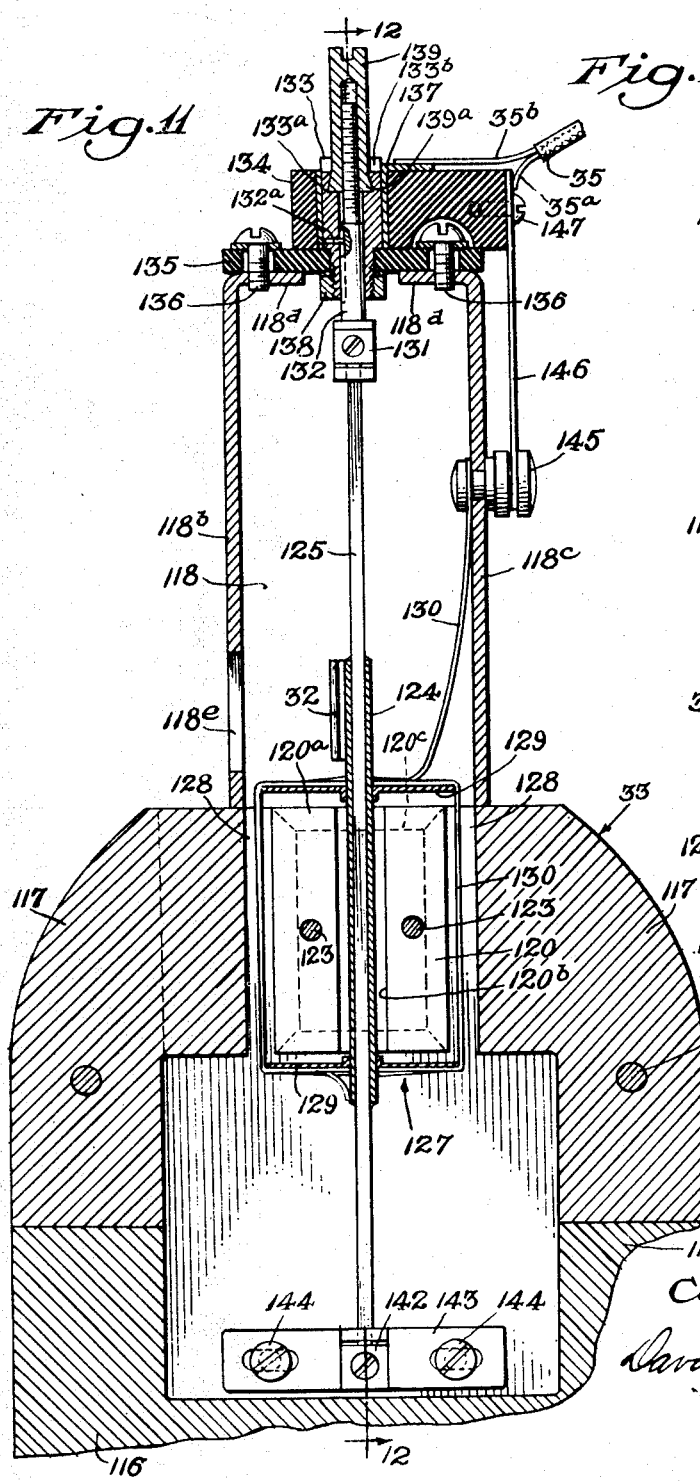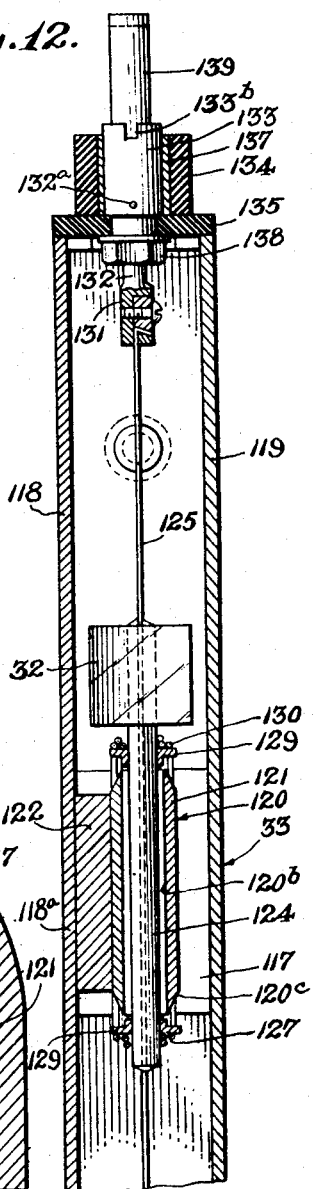

Patented Dec. 26, 1950

2,535,065

UNITED STATES PATENT OFFICE 2,535,065

GALVANOMETER

Carl A. Heiland, Denver, Colo., assignor to Heiland Research Corporation, Denver, Colo., a corporation of Colorado Application August 11, 1944, Serial No. 549,105

14 Claims. (Cl. 171—95)

This invention relates to a recording and indicating galvanometer capable of a wide variety of uses and particularly adapted for use in a recording system wherein an immediately visible and permanent record is made of electrical or other phenomena of an oscillatory or varying character through the use of essentially invisible radiations, which system is described and claimed in a copending application, Serial No. 549,104, filed August 11, 1944.

A galvanometer ordinarily comprises a magnet terminating in pole pieces between which there is mounted for oscillatory movement a suspended coil arranged for connection in an electric circuit in which the phenomena to be studied are present and a mirror or pointer attached to or movable with the coil gives an indication of the nature of the oscillations which are present in the circuit. One object of the present invention is to provide an improved galvanometer comprising the fundamental parts referred to, in which a compact and highly sensitive arrangement is provided by locating all of the principal parts except the mirror in the plane of incidence, that is, the plane in which light rays or other rays pass to and are reflected from the galvanometer during its operation. To attain this objective, the dimensions of the magnet and pole pieces at right angles to the plane of incidence are as small as possible, thus facilitating the construction of a multiple galvanometer comprising magnetic fields which are parallel to each other and which lie in the planes of incidence of their respective mirrors, while the planes of the coils are also in the planes of incidence and at right angles to the planes or axes of the mirrors. A further object of the invention is to provide an improved construction wherein each galvanometer comprises a minimum number of parts which may be readily assembled. Still another object is to provide a galvanometer comprising a plurality of mirror-carrying units arranged side by side in combination with means for independently adjusting each galvanometer bodily about the center of its mirror so that the mirror may be properly directed to reflect its beam to the desired point. Another object is to provide a galvanometer having opposed pole faces and an intermediate stationary armature core forming air gaps in which are located the opposite parallel arms of the coil or winding which is supported entirely by means located outside of said air gaps. A further object of the invention is to provide a galvanometer comprising pole faces and an intervening field piece in combination with an improved suspension of the vibratory coil which is so mounted that it may be adjusted laterally of the axis of oscillation to position the coil properly in the air gaps, while also permitting adjustment of the tension of the suspension ribbon in order to regulate the sensitivity of the device. The invention also comprises means for regulating the admission to the galvanometer mirror of the rays which are reflected therefrom during its use for indicating or recording purposes. Other objects relate to various features of construction and arrangement which will appear more fully hereinafter.

The nature of the invention will be understood from the following specification taken with the accompanying drawings in which one embodiment is illustrated in association with one form of recording apparatus. In the drawings, Figure 1 shows a vertical section through one form of recording apparatus which includes the galvanometer of the present invention, the galvanometer comprising a plurality of separate units which are illustrated in end elevation;

Fig. 3 shows a vertical section through one of the galvanometers embodied in the apparatus illustrated in Fig. 1 and through certain parts of the recording apparatus which are associated therewith;

Fig. 4 shows a sectional view taken on the line 4—4 of Fig. 3;

Fig. 7 shows an enlarged vertical section through one end portion of the receiving mirror assembly which is illustrated in the left-hand part of Fig. 3, showing the means for effecting the vertical and angular adjustments thereof;

Fig. 8 shows a vertical section through one end portion of the projection mirror illustrated in the left-hand portion of Fig. 3 with associated parts of the apparatus, illustrating the means for adjusting the normal angular position of this mirror;

Fig. 9 shows a horizontal section taken on the line 9—9 of Fig. 3 through one of the individual galvanometers, illustrating the structure of the field and armature cores;

Fig. 10 is a perspective view of the side plates which form the housing of each galvanometer;

Fig. 11 is a partial enlarged vertical section through one of the galvanometers, similar to the section illustrated in Fig. 3, showing in greater detail the structure of the individual parts; and Fig. 12 is a partial vertical section taken on the line 12—12 of Fig. 11.

In the accompanying drawings, the present invention is illustrated as being embodied in a multigalvanometer employing a plurality of separate units which are arranged side by side and which may be employed in the simultaneous study and recording of several different electrical phenomena which are represented by oscillations in separate electrical circuits. This galvanometer is illustrated in connection with the recording apparatus which is described and claimed in the above-mentioned copending application in the use of which invisible radiations such as ultraviolet rays or infra-red rays are caused to be reflected by cylindrical mirrors to the mirrors of the individual galvanometers which are also preferably cylindrical in form, and these galvanometer mirrors, which are caused to oscillate in response to the oscillations present in the electric circuits under investigation, reflect their beams to a receiving mirror, also preferably of cylindrical form, which directs the beams of the several galvanometers to the surface of the moving film which is so sensitized that it is responsive only to the invisible radiations being employed. This film reacts immediately to produce a permanent record of the oscillations, which record may be viewed through a filter forming a portion of the wall of the housing in which the apparatus is contained, this filter being of such a nature that it screens out the invisible radiations which are employed in making the record while permitting the record on the moving sheet to be viewed in daylight. With this preliminary explanation, the more general features of the recording system will be described preliminary to setting forth the details of the improved galvanometer which is embodied in this system.

Figures 1, 2:
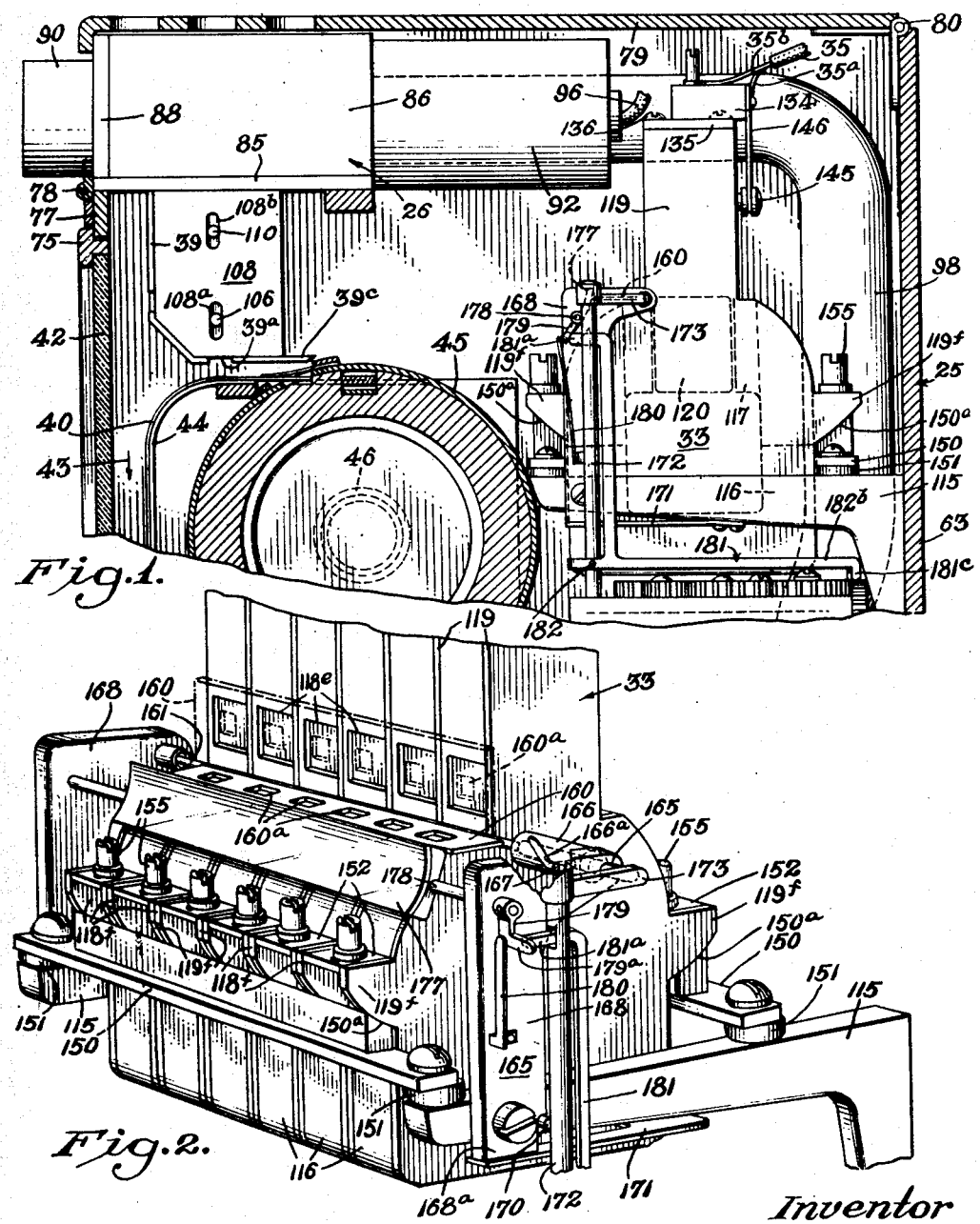
Fig. 2 is a perspective view of the lower part of the galvanometer and associated parts, illustrating the means for controlling the radiation admitted to the galvanometer mirrors and the means for periodically reflecting beams of invisible radiations which are adapted to form spaced time lines on a sensitized film which is employed in the recording apparatus.
Figure 5:
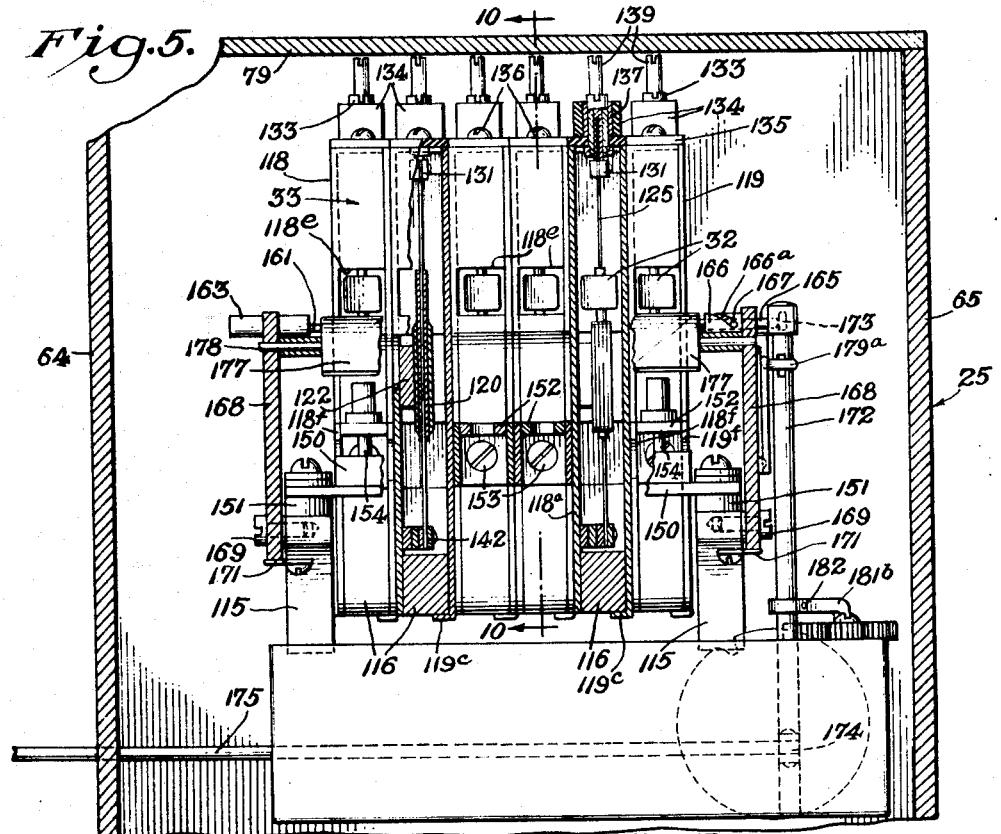
Fig. 5 shows a vertical section taken through the casing of the recording apparatus and illustrating in front elevation the galvanometer of the present invention, some of the parts being broken away and some of the galvanometers being shown in front elevation while others are shown partially in vertical section.
Figure 6:
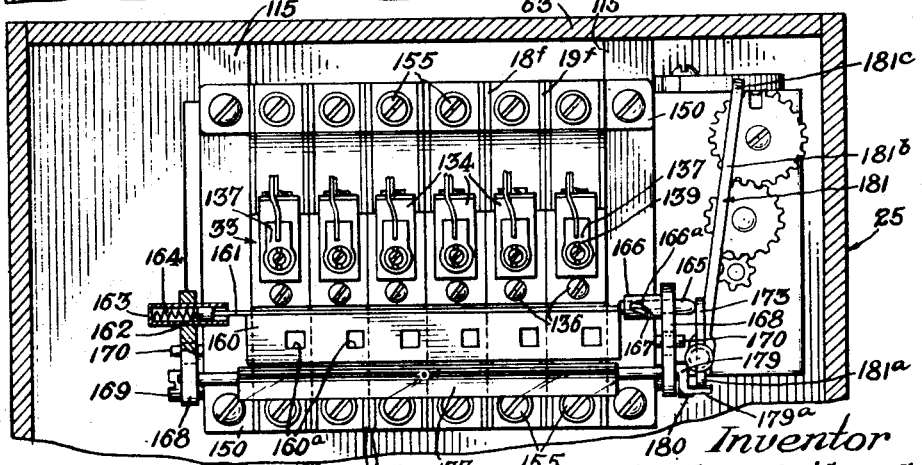
Fig. 6 shows a top plan view of the galvanometer illustrated in Fig. 5.

As illustrated particularly in Figs. 1, 3 and 4, the recording apparatus comprises a portable housing 25 having mounted in the upper part thereof an auxiliary casing 26 containing the source of invisible radiations which, in this instance, are illustrated as a bulb 27 adapted to be connected in an electric circuit and embodying a tube 28 adapted to emit the invisible radiations which may be ultra-violet rays or infra-red rays, or combinations of these rays, depending upon the character of the bulb which is used. These rays pass downwardly through a slot 26a in the bottom of the auxiliary casing 26 along a line 29 and impinge upon the concave surface of a cylindrical projection mirror 30 which is so designated because it is constructed as an arcuate segment of a complete cylinder with its axis extending horizontally. This mirror is adjustable angularly and the invisible rays pass from its surface along a line 31 to the concave surfaces of a plurality of cylindrical galvanometer mirrors 32 which are mounted to oscillate with the movable elements of a plurality of closely arranged galvanometers 33 constructed according to the principles of the present invention. These galvanometers are arranged side by side and each one is connected by a cable 35 with a source of electrical oscillations to be studied with the use of the recording apparatus. The mirrors of these galvanometers oscillate about vertical axes in response to the oscillations in the respective circuits to which they are connected and the beam of invisible radiations 36 which is reflected from each galvanometer mirror 32 is thus caused to oscillate as it passes to a receiving mirror 37 which is constructed as a segment of a cylinder and which is common to all of the galvanometers so that the invisible beams 36 received from the galvanometer mirrors are reflected downwardly along the lines 38 through an opening 39a in a shield or apron 39, to the sensitized film or paper 40 upon which the permanent record is made, this sheet being sensitized so that it is responsive only to the kind of invisible radiations which are being produced by the tube 28. A part of the invisible rays reflected from the galvanometer mirrors 32 passes between the mirrors 30 and 37, along the line 41, and these rays impinge upon the surface of a fluorescent coated screen 34, resulting in a bright line on that screen which indicates the fluctuations of the galvanometer mirrors to the observer through a slot 39b which is formed in the apron 39 and positioned opposite the filter screen 42 forming a substantial part of the front wall of the case or housing 25 and formed to screen out from the outside light the invisible radiations which are employed in producing the record on the sensitized film.

The filter 42, which thus excludes the invisible radiations passing from the bulb 27, serves to permit the operator to view the permanent record which is formed on the film or paper 40 by the oscillating beams 38 directed thereto from the receiving mirror 37. The sensitization of the film being such that a permanent record is immediately made, this record may be viewed as the film 40 passes downwardly in the direction of the arrow 43 in front of a guiding plate 44. The film is continuously supplied from a magazine 45 containing a drum or reel 46 upon which the sensitized paper is wound and, after passing over the guide plate 44, the exposed portion of the film is wound up on another reel or drum, not illustrated, so that the film is continuously withdrawn from one magazine and continuously wound up on a drum in another magazine during the operation of the apparatus.

As illustrated in the drawings, the case or housing 25, in which the recording apparatus is mounted, comprises a back wall 68 having hinged thereon at 69 a top wall or cover 70 which is adapted also to serve as a closure for the auxiliary casing 26 when it is in closed position. At the front of the housing, the apparatus is enclosed by a door 75 in which the filter 42 is mounted, and the upper edge of this door overlaps a transverse frame member 77 having attached thereto a hinge 78 about which the auxiliary casing 26 and its contents may be swung forwardly out of the housing 25 when the cover 79 has been elevated. The casing 26 has side walls 86, a back wall 87 and a front wall 88, all of which are attached to a bottom wall 85, thus forming an enclosure of rectangular cross section to receive the bulb 27 which projects through an aperture 88ª in the forward wall of the casing. The bulb is enclosed by a metal tube 90 which is closed at its forward end and which projects through an aperture in the rear wall 87, terminating in the screw threaded stem portion which engages a socket 94. This socket is located in a sleeve 92 which is secured to a ring 91 attached to the rear end of the casing 26 and the rear end of the sleeve is closed by a disk 93 having an aperture therein through which extends a cable 96 containing the conductors which lead from a source of electrical energy to the socket 94, so that the tube 28 is thereby energized to produce the invisible radiations. A conduit 98 is adapted to convey air under pressure to the casing 26 for the purpose of cooling the bulb during its operation. The shell 90 which encloses the bulb 27 is provided on its under side with a slot 90ª registering with the slot 26ª previously referred to so that the invisible radiations proceeding from the tube pass downwardly along the line 29 to the projection mirror 30 comprising a mirror proper which is mounted upon a backing plate and provided at its ends with relatively fixed trunnions 100, shown in Fig. 8, which are journaled in bearings formed in bearing plates 101 attached to the under side of the bottom wall of the casing 26. One of the trunnions has adjustably mounted thereon by means of a set screw 102 a laterally projecting arm 103 which extends between two lugs 101ª and 101ᵇ formed on the adjacent bearing plate 101. The lug 101ª is socketed to receive a coil spring 104 which engages the under side of the arm 103, and the upper side of this arm is engaged by an adjusting screw 105 having a threaded engagement with the lug 101ᵇ and with the bottom wall 85 of the auxiliary casing. When the top cover 79 of the housing 25 has been elevated, the screw 105 is accessible for the purpose of adjusting the angular position of the arm 103 and the corresponding angular position of the mirror 30, which adjustment may be required in order to cause the beam 31 of invisible radiations to impinge at the proper points upon the cylindrical mirrors 32 of the galvanometers 33. By the use of the set screw 102 for regulating the normal position of the arm 103 on its trunnion 100, a wide range of adjustability may thus be obtained.

The receiving mirror 37 is also adjustably mounted, as shown particularly in Figs. 3, 4 and 7, and it is also capable of adjustment vertically in order to vary its spaced relation to the film or paper 40. For this purpose, the mirror 37 and its backing plate are provided with longitudinally extending trunnions 106 which are journaled in bearing plates 107 and which slidably engage elongated slots 108ª formed in supporting plates 108 mounted on the bottom wall 85 of the auxiliary casing and constituting the end walls of the apron or shield 39, previously referred to, which encloses the mirrors 30 and 37 except on the inner sides thereof which are directed toward the galvanometer mirrors 32. These end plates 108 are shaped to conform to the configuration of the apron 39 and the bottom wall 39ᶜ of the apron, which has the slot 39ª formed therein, is extended rearwardly beyond the end plates 108, as shown in Figs. 1 and 3, in order to protect the sensitized film or paper 40 from all light rays or other rays except the invisible radiations which pass thereto through the slot 39ª. The end plates 108 are also provided with elongated slots 108ᵇ, located in vertical alignment with the slots 108ª and arranged to be engaged by pins 110 which extend from the upper portions of the plates 107. The upper parts of the plates 107 are provided with lugs 107ª which are threadedly engaged by adjusting screws 111 which extend upwardly through the bottom plate 85 of the auxiliary casing, being provided above this wall with heads 111ª adapted to be engaged by a screw driver for regulating the elevation of the plates 107 with respect to the supporting plates 108, thereby varying the spaced relation of the mirror 37 and the portion of the film 40 which is located beneath the slot 39ª.

One end of the mirror 37 is provided with a rearwardly extending arm 112 which is provided with an aperture loosely engaged by the lower unthreaded portion of an adjusting screw 113 which extends upwardly and threadedly engages an aperture in a lug 107ᵇ carried by the adjacent plate 107. The upper threaded end of this adjusting screw extends through an aperture 85ª in the bottom wall 85 of the auxiliary casing and the notched end of this screw may be engaged by a screw driver for regulating its position in the lug 107ᵇ. A coil spring 114 is mounted around the lower end of the adjusting screw between the lug 107ᵇ and the end of the arm 112 and normally serves to maintain the arm 112 against the head 113ª of the screw so that, when the screw is adjusted in the lug 107ᵇ, the angular position of the mirror 37 is varied in order to cause the beam 38 of invisible radiations to pass properly through the aperture 39ª in the shield 39.

The galvanometers 33 which include the recording mirrors 32 are arranged in a group in parallel relationship at the rear of the cabinet 25 where they are supported by a pair of parallel brackets 115 secured to the back plate 63 and extending horizontally therefrom. In the embodiment illustrated, there are six identical galvanometers supported by and between these brackets, this being a convenient number for the simultaneous study and recording of a number of electrical phenomena. The galvanometers are so constructed that their dimensions are comparatively small measured transversely to the plane of incidence of the invisible rays, that is, the plane determined by the lines 31 and 36 for each galvanometer. The magnetic fields of adjacent galvanometers are parallel to each other and parallel to or coincident with the planes of incidence and the coils of the movable elements of the galvanometers also occupy these planes of incidence with the mirrors 32 mounted at right angles to those planes. To accomplish this arrangement, each galvanometer 33 includes a permanent magnet 116 having attached to its opposite arms two pole pieces 117 which, in effect, form continuations thereof. These pole pieces are provided with opposite pole faces 117ª, the dimensions of which are very limited, measured transversely to the plane of incidence, as shown in Fig. 9, this result being accomplished by tapering the magnetizable material of these pole pieces on opposite sides of each pole face, as indicated at 117ᵇ, the two surfaces 117ᵇ of each pole piece making an angle of about 60 degrees with each other. The magnet 116 and the pole pieces 117 of each galvanometer are mounted between a pair of non-magnetic side plates 118 and 119 which have the form shown particularly in Fig. 10, and a stationary field piece or armature core 120 is mounted between the pole faces 117ª. The method of assembly of these parts is shown particularly in Figs. 1, 5, 6, 9, 11 and 12. The pole pieces 117 are first placed against the lower part 118ª of the plate 118 which is shaped to conform to the contour of these members and are secured thereto by screws 121. The stationary field piece or armature core 120 is attached to the side plate 118 by means of a non-magnetic spacing block 122 which is attached to the plate 118 and engaged by screws 123 which pass through the identical complementary parts 120ª of the field member 120. The complementary members 120ª are provided with vertically extending recesses which form a vertical channel 120ᵇ of rectangular cross section which is adapted to receive a tubular member 124, formed of aluminum or the like and mounted upon the suspended shaft or ribbon 125 formed of gold alloy or the like which carries the movable coil 127 of the armature. The parts 120ª of the field piece 120 are tapered along their vertical edges 120ᶜ so that their vertical faces are of the same width as the pole faces 117ª from which they are spaced by air gaps 128. After the field piece 120 has been mounted on the block 122 to form the air gaps 128 of equal dimensions, and after the coil 127 has been assembled and placed in its proper position, as hereinafter described, the magnet 116 is put in place against the bottom faces of the pole pieces 117 and the side plate 119 of the galvanometer is attached by screws 126 or the like to the field pieces 117, with the flange 119ᶜ of this plate extending below and supporting the magnet, thus forming a unitary structure.

In the assembly and mounting of the armature, cross bars 129 are secured to the upper and lower portions of the tube 124 to extend parallel to each other and form a frame for the armature coil 127 which is formed by winding relatively small insulated copper wire 130, such as gauge 46 copper wire insulated with Bakelite enamel, about the cross bars. After mounting the mirror 32 on the upper end of the tube 124, the ribbon 125 is threaded through the tube and the coil is placed over the back member 129ª of the field piece with the tube 124 engaging the rear recess 120ᵇ, the member 129ª being then held by pins on the block 122 which is brazed or otherwise secured to the side plate 118. Thereupon, the upper and lower ends of the ribbon are secured by their clamping devices, hereinafter described, and the tube 124 is adjusted vertically to the proper position on the ribbon and then secured to the ribbon. After adjusting the ribbon laterally, as hereinafter described, to position the coil properly in the air gaps and to position the tube in the recess 120ᵇ, the front member is put in place and the screws 123 inserted to hold the field piece in position. This method of construction locates the supports for the coil entirely outside of the air gaps 128 so that a maximum of space is allowed for the portions of the windings which extend through the gaps. The vertical stretches of the coil occupy positions midway of the gaps 128 and the coil 127 is thus free to oscillate about the axis of the ribbon 125, being influenced by the current, the torsion of the ribbon and the action of the magnetic field.

The side plate 118 has an upwardly extending part of rectangular outline which is provided along its front edge with a transversely extending flange 118ᵇ and along its rear edge with a transversely extending flange 118ᶜ, which flanges terminate at their upper ends in inturned lips 118ᵈ having their outer surfaces lying flush with the upper end of the body of the plate, thus forming an enclosure for the ribbon 125 and its upper mounting as well as for the mirror 32 which is mounted on the upper end of the tube 124. The forward flange 118ᵇ of the plate 118 is provided with a square opening 118ᵉ which provides a passage for the beam 31 passing to the mirror 32 and for the reflected beam 36 passing therefrom, as shown in Fig. 3. The lower part 119ª of the side plate 119 is shaped to conform to the outline of the magnet 116 and the pole pieces 117 and its upper rectangular extension 119ᵇ of the other side plate is adapted to fit against the outer margins of the flanges 118ᵇ and 118ᶜ, thus completing the enclosure or housing in which the upper part of the ribbon 125 and the mirror 32 are mounted. The plate 119 is provided at its bottom with a transverse flange 119ᶜ which underlies and supports the magnet 116.

The mounting of the ribbon 125 is illustrated particularly in Figs. 5, 6, 11 and 12, where the upper end of the ribbon is illustrated as being secured in a clamp 131 mounted on the lower end of a shank 132 which is keyed within a tubular metal torsion head 133. An insulating connector block 134 is seated upon an insulating plate 135, formed of Bakelite or the like, and this block 134 has a vertical aperture in which there is secured a metallic bushing 137 arranged to fit over the torsion head 133. The plate 135, to which the torsion head 133 is secured, is provided with elongated slots engaged by screws 136 which enter threaded holes in the lips 118ᵈ formed on the upper end of the side plate 118 so that, by loosening the screws, the plate 135 and the parts mounted thereon may be shifted with respect to the plates 118 and 119. The lower part of the torsion head 133 is threaded to pass through an aperture in the plate 135 and the lower end thereof is engaged by a nut 138, thus clamping the torsion head frictionally in position. The upper end of the shank 132 is threaded for engagement by an elongated nut 139 which is notched at its upper end for engagement by a screw driver or the like and which has an annular undercut flange 139ª rotatably engaging an annular groove 133ª in the torsion head so that upon rotation of the nut 139 there is effected an endwise movement of the shank 132 which is splined to the torsion head 133 by a pin or screw 132ª, thereby regulating the tension of the ribbon 125. The notches 133ᵇ in the upper end of the torsion head 133 may be engaged by a spanner wrench or the like and the entire torsion head may be thus rotated, against the frictional resistance exerted by the clamping nut 138, to carry with it the ribbon 125 and thereby adjust the position of the mirror 32 so that the beam 31 received thereby will be properly directed along the line 36 to the mirror 37.

At its bottom end, the ribbon 125 is secured in a clamp 142 fixed on an insulating plate 143 which is provided with elongated slots engaged by screws 144 by which the plate is clamped to the side plate 118 of the galvanometer at a point slightly above the lower part of the magnet 116. By loosening the screws 136 and the screws 144, both of the insulating plates 135 and 143 may be adjusted simultaneously on their supports to cause the vertical portions of the coil 127 to occupy the proper positions within the air gaps 128.

One end portion of the wire 130 which forms the winding of each galvanometer coil is extended loosely to an insulated terminal post 145 mounted on the flange 118c of the side plate 118, as shown in Fig. 11. The outer part of this terminal member is slotted for engagement by the bifurcated lower end of a metal clip 146 which extends upwardly and is secured by a terminal screw 147 to one end of the connector block 134 where it is attached to one wire 35a of the supply cable 35 through which electrical oscillations to be studied and recorded are received. The other wire 35b of this electrical connection is soldered to a flange formed on the upper end of the metallic bushing 137, thus forming an electrical connection through the torsion head 133 and the shank 132 with the ribbon 125 to which the other end of the wire 130 is soldered or otherwise secured in the region of the coil 127. The metal bushing 137 fixed in the connector block 134 fits over the torsion head 133 and the entire block 134 and the parts carried thereby may be lifted out of engagement with the torsion head and the terminal post 145 to disconnect the supply conductors from the galvanometer.

The ribbon 125 is constructed as a comparatively narrow flat member occupying a plane which is parallel to or coincident with the plane of incidence of the beam coming to the mirror 32 so that the oscillation of the coil 127 sets up a torsional strain in the ribbon which tends to return it and the mirror to their normal positions. This arrangement of the flat ribbon 125 with respect to the plane of incidence of the beam also has the advantage that it keeps the optical dimensions constant, since the coil will not vibrate toward and from the source of radiations under the influence of the vibrations of adjacent machines or the like. Thus, incidental vibrations are less likely to effect the optical reproduction. By adjusting the nuts 139 at the upper ends of the shanks 132, the tensions of the ribbons 125 of the various galvanometers may be regulated in order to adjust the sensitivity of the galvanometers to the oscillations in the electric current traveling through the coils 127. By adjusting the torsion head 133 of each galvanometer angularly on its supporting plate 135, the connected mirror 32 may be regulated in its position so that the beam 36 reflected therefrom will impinge upon the mirror 37 and be directed to the proper position on the film or paper.

In addition to the adjustments just mentioned, provision is made for adjusting the galvanometers bodily on their supporting brackets 115 about the longitudinal center lines of the reflecting surfaces of their respective mirrors 32, thus causing a vertical adjustment of the positions of the beam 36 so that it will be reflected properly to the mirror 37. The means for effecting this angular adjustment of the galvanometers are shown particularly in Figs. 1, 3, 5 and 6. Mounted on the supporting brackets 115 at the front and rear sides of the galvanometers are a pair of supporting bars 150 which are secured to the brackets with rubber blocks 151 interposed between the brackets and their under sides to provide a somewhat resilient mounting for the galvanometers so that they will be less subject to vibrations of other objects. These supporting bars 150 are provided with upwardly extending arcuate bearing surfaces 150a which are concentric with the center of the cylindrical mirrors 32 of the galvanometers, as illustrated particularly in Fig. 3. The side plates 118 and 119 of each galvanometer are provided on their front and rear edges with projections 118f and 119f, respectively, which have lower bearing surfaces concentric with the surfaces 150a, so that these projections may rest edgewise on the bars 150 and permit angular adjustment of the field structure of the galvanometer and all other parts thereof about the longitudinal center line of the reflecting surface of the associated mirror 32. At each side of each galvanometer, an angle bracket 152 is secured to the pole piece 117 by a screw 153, the vertical flange of each bracket lies between two of the projections 118f and 119f and the top flange thereof lies flush with the upper surfaces of these projections. The top flange of each bracket is provided with an elongated slot 152a engaged by a threaded stud 154 secured in the underlying bar 150. The upper ends of these studs are engaged by clamping nuts 155 which are slotted for engagement by a wrench or screw driver so that they may be adjusted to clamp the galvanometer in position or release it so that it may be angularly adjusted in the manner described. In this way, the several galvanometers 33 may be independently adjusted on the supporting bars 150 in order to cause the beams 36 reflected therefrom to strike the mirror 37 in the proper locations.

In the recording system herein described, means are preferably employed for changing the speed of movement of the film or paper 40, as set forth in said copending application, and, in order that proper results may be obtained when operating at different speeds, apparatus has been provided in association with the galvanometers for cutting down the radiations admitted to the mirrors 32 when operating at low speeds and, in addition, means have been provided for automatically marking the sensitized film or sheet with equally spaced time lines appropriate for the speed at which the film is moving. The means for reducing the amount of light admitted to and reflected from the galvanometer mirrors 32 when operating at a low speed includes a shutter 160 which normally occupies a horizontal position, as shown in Fig. 3, and which is adapted to be swung upwardly to the position shown by dotted lines in Fig. 2. This shutter is in the form of a thin flat plate having a plurality of square apertures 160a formed therein which are located so that, when the shutter is in its upright position, each of the apertures 160a will be located opposite one of the square apertures 118e in the galvanometer casing. The apertures 160a are substantially smaller than the apertures 118e so that, when the shutter is in its upright position, the invisible radiations passing to and reflected from each galvanometer mirror 32 are substantially reduced, which is desirable in order to prevent overexposure of the film when moving at low speeds. The shutter 160 is mounted on a small shaft 161 which has one end secured to a piston 162 mounted to travel in a cylinder 163 in which there is a coil spring 164 tending normally to move the shaft and its shutter toward the right, as viewed in Figs. 2, 5 and 6. The other end of the shaft 161 is secured to a plunger 165 which is slidably mounted in a sleeve 166 at the right end of the apparatus, as viewed in Figs. 2, 5 and 6. The sleeve 166 is provided with a helical slot 166a engaged by a pin 167 which is fixed on the plunger 165. The cylinder 163 and the sleeve 166 are secured in apertures in two supporting plates 168 which have their lower ends pivotally mounted on screws 169 engaging the threaded apertures in the brackets 115 by which the galvanometers are supported. The plates 168 normally occupy the elevated positions shown in Figs. 1, 2 and 5, in which positions the rearward swinging of these members is limited by pins 170 fixed in the brackets 115. The members 168 are normally held in their upright positions by leaf springs 171 which are secured to the under sides of the brackets 115 with their free ends pressing against the flat surfaces 168ª which are formed on the lower ends of the members 168. When it is necessary to have access to the galvanometers from the front, the supporting plates 168 and the parts carried thereby may be swung downwardly and forwardly to permit removal of the galvanometer. With this mounting of the shutter 160, it will be apparent that, upon pressing inwardly toward the left on the plunger 165, the inclined slot 166ª, coacting with the pin 167, will rotate the shaft 161 and thus elevate the shutter to its upright position. This movement is brought about automatically at the time of changing the speed of operation of the camera, by a shaft 172 which extends vertically at one side of the group of galvanometers and which has mounted thereon a rearwardly extending arm 173 positioned opposite the end of the plunger 165, as shown particularly in Fig. 2. This shaft 172 is provided near its lower end with a rearwardly projecting arm 174 which is pivotally connected to a shift rod 175, through the operation of which the change from a minutely rate of recording, for example, to an hourly rate, is effected, as hereinafter set forth. When the shift rod 175 is actuated to change to the slower rate of operation, the arm 173 on the shaft 172 is at the same time moved toward the left, as viewed in the drawings, to move the shutter 160 to its upper position and thereby restrict the galvanometer openings.

The plates 168, which are pivotally mounted on the brackets 115, also serve to support a concave cylindrical mirror 177 which is fixed on a shaft 178 journaled in the forward portions of the plates 168 in such positions that the mirror 177 occupies a position just below the lower margins of the galvanometer openings 118e and in front of the shutter 160 when the shutter is in its normal horizontal position, as shown in Figs. 2 and 3. The shaft 178 is provided at the end adjament the shaft 172 with a crank arm 179 which is engaged by a leaf spring 180 attached to the adjacent supporting plate 168 and adapted to turn the mirror 177 to a position where it will direct a part of the rays received from the mirror 30 to the mirror 37. The crank arm 179 has a projecting part 179ª which lies in the path of movement of the end portion 181ª of a trip lever 181 of bell crank form which is pivoted by a pin 182 on a lower part of the shaft 172 so that the lever turns with the shaft. This trip lever has a horizontal arm 181ᵇ terminating in a downwardly extending finger 181ᶜ which is adapted to be actuated at the end of each minute when the apparatus is operating at a minutely rate and at the end of the hour when the apparatus is operating on an hourly rate. With each downward movement of the arm 181ᵇ the crank arm 179 is released by the extremity 181ª of the lever which passes loosely through an aperture in the upper part of the shaft 172 and the crank arm 179 is thereby rotated by the spring 180 to cause the mirror 177 to reflect a part of the rays passing from the mirror 30 directly to the mirror 37, independently of the galvanometer mirrors, so that an invisible radiation is thereby directed momentarily onto the surface of the film to form a horizontal time line.

It will be observed that in each galvanometer of the galvanometer system described above, the use of a cylindrical mirror 30 provides a line source of invisible radiations, as distinguished from a point source. These radiations are reflected to the cylindrical mirror 32, having its axis parallel to the axis of rotation of the galvanometer, and this mirror reflects the rays of the concentrating cylindrical mirror 37 by which they are directed to the paper. This is a very efficient system from the optical viewpoint, since the mirror 37 causes the image of the line source to be concentrated onto a spot with such increased intensity as to obtain an immediately visible image.

Although one form of the invention has been shown and described by way of illustration, it will be understood that it may be constructed in various other embodiments without departing from the scope of the appended claims. The term "oscillatory" as used in the claims to refer to phenomena which may be studied with the use of the galvanometer of the present invention is to be construed broadly to include any phenomena which vary with time and is not limited to fluctuations which are continuous or regular in their manifestations.

I claim:

1. An electrical galvanometer comprising, a pair of metal side plates formed of non-magnetic material, a magnet and pole pieces mounted between and contacting on their sides with said side plates, a ribbon carried by said side plates and extending between said pole pieces, a coil carried by said ribbon between said pole pieces, said ribbon having its plane extending in the direction in which flux passes between said pole pieces and extending through and in opposite directions from said coil, and a mirror mounted on said ribbon.

2. An electrical galvanometer comprising, a pair of metal side plates formed of non-magnetic material, a magnet and pole pieces mounted between and contacting on their sides with said side plates, a field member secured to one of said side plates between said pole pieces and spaced from said pole pieces, a ribbon fixed in supports by said side plates, and a coil carried by said ribbon and having parts movable in said air gaps, said ribbon having its plane extending in the direction in which flux passes between said pole pieces and extending through and in opposite directions from said coil.

3. An electrical galvanometer comprising, a pair of sheet metal side plates formed of non-magnetic material, a magnet and spaced pole pieces mounted between and secured to said side plates, said side plates having parts extending above said pole pieces and provided with transverse flanges to form a housing, a ribbon having its upper end adjustably mounted on certain of said flanges and suspended between said pole faces, a coil mounted on said ribbon, and means for mounting the lower end of said ribbon for lateral and endwise adjustment on one of said side plates.

4. An electrical galvanometer comprising, a pair of sheet metal side plates formed of non-magnetic material, a magnet and spaced pole pieces mounted between and secured to said side plates, said side plates having parts extending above said pole pieces, a field member secured to one of said side plates and positioned between said pole pieces to form air gaps, said field member having a vertical aperture therethrough, a ribbon freely passing through said aperture, a coil mounted on said ribbon and having parts extending through said air gaps, and means for adjustably securing the ends of said ribbon to one of said side plates to permit lateral adjustment of said ribbon to position said coil in said air gaps.

5. An electrical galvanometer comprising, a pair of sheet metal side plates formed of nonmagnetic material, a magnet and spaced pole pieces mounted between and secured to said side plates, said side plates having parts extending above said pole pieces, a field member secured to one of said side plates and positioned between said pole pieces to form air gaps, said field member having a vertical aperture therethrough, a ribbon extending through said aperture, a coil mounted on said ribbon and having parts extending through said air gaps, means for adjustably securing the ends of said ribbon with respect to said side plates to permit lateral adjustment of said ribbon to position said coil in said air gaps, and means for adjusting the longitudinal tension in said ribbon.

6. An electrical galvanometer comprising, a magnet having spaced pole pieces, a field member mounted between said pole pieces and spaced therefrom to provide air gaps, a coil extending around said field member and through said air gaps, a vertical ribbon carrying said coil, means for holding said ribbon below said field member, an insulating plate mounted above said field member, a torsion head mounted on said plate, means for securing the upper part of said ribbon to said torsion head, and means for adjusting said insulating plate bodily transversely of said ribbon.

7. An electrical galvanometer comprising, a magnet having spaced pole pieces, a field member mounted between said pole pieces and spaced therefrom to provide air gaps, a coil extending around said field member and through said air gaps, a vertical ribbon carrying said coil, means for holding said ribbon below said field member, an insulating plate mounted above said field member, a torsion head mounted on said plate, means for securing the upper part of said ribbon to said torsion head, means for adjusting said insulating plate bodily transversely of said ribbon, a mirror carried by said ribbon, and means for adjusting said torsion head angularly on said plate.

8. An electrical galvanometer comprising, a magnet having spaced pole pieces, a field member mounted between said pole pieces and spaced therefrom to provide air gaps, a coil extending around said field member and through said air gaps, a vertical ribbon carrying said coil, means for holding said ribbon below said field member, an insulating plate mounted above said field member, a torsion head mounted on said plate, means for securing the upper part of said ribbon to said torsion head, means for adjusting said insulating plate bodily transversely of said ribbon, a mirror carried by said ribbon, means for adjusting said torsion head angularly on said plate, and means for adjusting said ribbon endwise with respect to said torsion head.

9. An electrical galvanometer comprising, a magnet having spaced pole pieces, a field member mounted between said pole pieces and spaced therefrom to provide air gaps, a coil extending around said field member and through said air gaps, a vertical ribbon carrying said coil, means for holding said ribbon below said field member, an insulating plate mounted above said field member, a torsion head mounted on said plate, a shank splined in said torsion head, and a nut threadedly engaging said shank and contacting said torsion head for adjusting the tension of said ribbon.

10. An electrical galvanometer comprising, a magnet having spaced pole pieces, a field member mounted between said pole pieces and spaced therefrom to provide air gaps, a coil extending around said field member and through said air gaps, a vertical ribbon carrying said coil, means for holding said ribbon below said field member, an insulating plate mounted above said field member, a torsion head mounted on said plate, a shank splined in said torsion head, a nut threadedly engaging said shank and contacting said torsion head for adjusting the tension of said ribbon, and means carried by said insulating plate for forming electrical connections with the terminals of said coil.

11. An electrical galvanometer comprising, a field structure having pole pieces and a source of magnetic lines of force, a ribbon fixed at its ends with respect to said field structure, a coil mounted on said ribbon for oscillatory movement between said pole pieces, a concave cylindrical mirror mounted with its axis extending vertically and parallel to the axis of said ribbon for movement with said coil, and means for adjusting said galvanometer bodily about the center of said mirror.

12. A galvanometer comprising, a field structure including spaced opposed magnetic poles and a source of magnetic lines of force, a coil mounted for rotation on an axis between the opposed poles, a mirror associated with the coil so that it moves with the coil about an axis parallel with the coil axis, a source of radiation adapted to be directed to the mirror and reflected therefrom to be recorded, and means for adjusting the field structure and its poles together with the coil and the mirror so they will move as a unit about a center coinciding with the point of reflection of the mirror and in a plane extending in a direction parallel to the magnetic field passing between the poles.

13. A galvanometer comprising, a field structure including spaced opposed magnetic poles and a source of magnetic lines of force, a coil mounted for rotation on an axis between the opposed poles, a mirror associated with the coil so that it moves with the coil about an axis parallel with the coil axis but is positioned outside of the magnetic field, a source of radiation adapted to be directed to the mirror and reflected therefrom to be recorded, means for mounting the coil and the field structure and its poles for simultaneous movement about a center coinciding with the point of reflection of the mirror and in a plane extending parallel to the direction of the magnetic field passing between the poles, and means for adjustably positioning the coil mounting and poles about said center.

14. A galvanometer comprising, a field structure including spaced opposed magnetic poles and a source of magnetic lines of force, a coil mounted for rotation on an axis between the opposed poles, a mirror associated with the coil so that it moves with the coil about an axis parallel with the coil axis, a source of radiation adapted to be directed to the mirror and reflected therefrom so as to be recorded, said mirror being so mounted that a beam directed to and reflected from the mirror will be in a plane extending in the direction of the magnetic field, and means for adjusting the field structure and its poles together with the coil and the mirror so they will move as a unit parallel to the plane of the magnetic field passing between the poles and about a center coinciding with the point of reflection of the mirror.

CARL A. HEILAND.

REFERENCES CITED

The following references are of record in the file of this patent:

UNITED STATES PATENTS

| Number | Name | Date |
|---|---|---|
| 901,013 | Knott | Oct. 13, 1908 |
| 1,022,795 | McClair | Apr. 9, 1912 |
| 1,085,637 | Shay et al. | Feb. 3, 1914 |
| 1,416,824 | Hindle | May 23, 1922 |
| 1,702,650 | Hindle | Feb. 19, 1929 |
| 1,750,275 | Legg | Mar. 11, 1930 |
| 2,116,110 | Gauss | May 3, 1938 |
| 2,149,442 | Kannenstine | Mar. 7, 1939 |
| 2,153,010 | Snook | Apr. 4, 1939 |
| 2,234,430 | Ellis | Mar. 11, 1941 |
| 2,268,526 | Palmer | Dec. 30, 1941 |
| 2,326,252 | Rich | Aug. 10, 1943 |
| 2,389,081 | Redmond | Nov. 13, 1945 |